Figure 1:
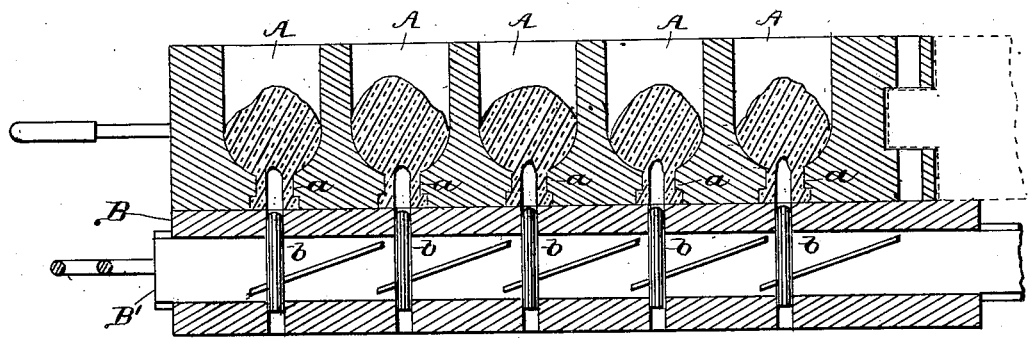

No. 699,058. Patented Apr. 29, 1902.
J. I., C. V., F. J., P. R. & F. L. ARBOGAST.
ART OF MANUFACTURING HOLLOW GLASSWARE.
(Application filed Feb. 11, 1902.)

(No Model.)

INVENTORS
John I. Arbogast
Charles V. Arbogast
Francis J. Arbogast
Frederick L. Arbogast
and Philip R. Arbogast by Connolly Bros.
Attorneys WITNESSES
C. W. Downing
H. L. Ramby

THE NORRIS PETERS CO., PHOTO-LITHO., WASHINGTON, D. C.

UNITED STATES PATENT OFFICE.

JOHN I. ARBOGAST, CHARLES V. ARBOGAST, FRANCIS J. ARBOGAST, PHILIP R. ARBOGAST, AND FREDERICK L. ARBOGAST, OF PITTSBURG, PENNSYLVANIA.

ART OF MANUFACTURING HOLLOW GLASSWARE.

SPECIFICATION forming part of Letters Patent No. 699,058, dated April 29, 1902.

Application filed February 11, 1902. Serial No. 93,561. (No specimens.)

*To all whom it may concern:*

Be it known that we, JOHN I. ARBOGAST, CHARLES V. ARBOGAST, FRANCIS J. ARBOGAST, PHILIP R. ARBOGAST, and FREDERICK L. ARBOGAST, citizens of the United States, residing at Pittsburg, in the county of Allegheny and State of Pennsylvania, have invented certain new and useful Improvements in the Art of Manufacturing Hollow Glassware; and we do hereby declare the following to be a full, clear, and exact description of the invention, such as will enable others skilled in the art to which it appertains to make and use the same.

This invention has relation to the manufacture of hollow glassware, and has for its object the provision of a novel method or process whereby the skill and experience now required in the production of hollow glassware is dispensed with, the cost of production greatly lessened, and the output of the glass-factory greatly increased.

In making hollow glassware—such, for example, as bottles—it is customary in accordance with the practice of many years to first blow the body of the article in a mold, then attach it in a reversed position to a punty, then reheat and shape and finish the neck, and finally anneal the finished article. The operations of blowing the article and then finishing the neck require skilled high-priced labor, but one article at a time is handled, and all the operations are necessarily conducted in the furnace-room of the factory, wherein are located the melting and reheating furnaces and the other necessary appliances. In other methods employed the neck or mouth is pressed in a mold and the blank reheated before becoming too cold and the body blown to completed shape in another mold. The annealing of the articles under such methods is necessarily a final step, and as the blowing and finishing operations have to be completed without allowing the glass to become cold the manufacture of glassware has certain well-defined and well-understood limitations.

As in all methods heretofore practiced where the neck is pressed and the body reheated and blown to shape it has been necessary to complete the article before it became cold, it was consequently necessary to keep it under continuous manipulation, reheating it from time to time to maintain the necessary softness of the glass, and hence each "shop" or group of hands working together was obliged to finish each article in succession by a series of continuous operations, so that the simultaneous production of a number of articles by each shop or group of hands was impracticable. In our process we propose to limit the work of each shop to the production of blanks having finished necks and to have the final blowing and completion of the bodies accomplished at a subsequent period by unskilled labor and without interfering with or dependence upon the workmen who are exclusively engaged in pressing the necks, and thus avoid the limitations in production that must necessarily prevail where any continuous manipulation of the glass from the time it is first gathered until the article is completed is practiced. The necessity of employing skilled labor and a number of operatives working together in a shop increases the cost of production and imposes a serious limitation on the output.

Our object is to obviate the difficulties heretofore experienced in the endeavors to produce hollow articles of glassware in quantity and without employing skilled labor or expensive and complicated machinery, and we have to this end found it expedient to radically depart from the order in which the various operations have heretofore been carried on and to adopt the following: first, to produce at one operation and in a single mold a number of blanks, of which only the neck part will be finished; second, to anneal these blanks; third, after annealing to reheat at one time a number of the blanks and to then blow the article in a mold to the completed form. The only operation or step in our process which is necessarily carried out in the melting-room is the pressing of the neck portion of the blank. After the blanks are annealed they are taken to the packing-room, where the reheating and blowing to finished form may be carried on by appliances which require but ordinary skill and experience.

We wish to call especial attention to the fact that the gist and essential feature of our process lies in the annealing of the blanks between the preliminary steps of shaping the neck and blowing the body and that this is the most radical departure from other processes—which our invention involves. Where the entire operation of making the articles is carried on in the one room and continuously—that is, without allowing the blanks to cool—skilled labor and great care are necessarily employed, so that the articles may be completely finished before being taken to the leer; but where, as in our process, the blowing of the blank to its completed shape is not done until after the annealing there is no danger attending the reheating, and this and the blowing may be conducted by unskilled labor and at a cost greatly less than now necessary in blowing articles in molds. It is our purpose in blowing the reheated articles to shape to use compressed air, and to thus substitute mechanical appliances for skilled labor.

Figure 2:
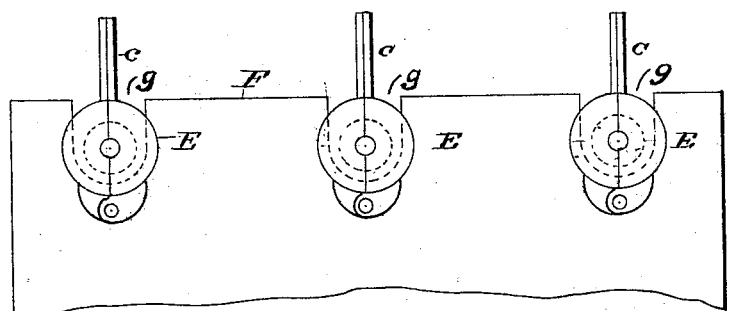
Figure 3:
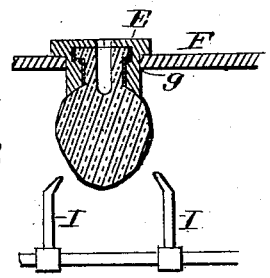
Figure 4:
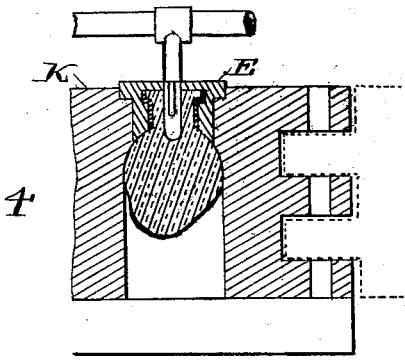

In the accompanying drawings, Figure 1 is a sectional view of a press-mold adapted for the first step of our process. Fig. 2 is a plan view of the reheating apparatus. Fig. 3 is a sectional view of the same, and Fig. 4 is a sectional view of a blow-mold adapted to the use of compressed air.

The mold shown in Fig. 1 is intended to press at one time a number of blanks and consists of a hinged two-part mold having several cavities A A, with extensions $a\ a$ at their bottoms cut to form the necks of the blanks. The base-plate B is pierced below each cavity for the passage of a plug $b$, and these plugs are supported by a sliding wedge-shaped plate B,' which in one position allows all the plugs to sink below the surface of the base-plate B, but which when drawn lengthwise elevates the plugs into the centers of the neck, forming portions of the mold-cavities. The mold being closed, the molten glass is gathered on the end of a punty, is inserted in each cavity through openings in the top of the mold, and the plugs are then elevated and enter the glass, so as to form the neck-opening and a small cavity in the ball above the neck. The insertion of the plug presses the glass against the walls of the cavity, so as to properly mold the neck. The plugs are now withdrawn, the mold is then opened, and the blanks are removed and placed in the leer to be annealed. After being annealed the blanks are ready for the reheating and finishing operation, and these are conducted in the following manner and preferably in what is known as the "packing-room:" The blanks are each inserted, with the neck part uppermost, in a suitable holder, which may consist of a two-part hinged ring E, having extensions $c$ to form a handle, and the holders or rings arranged on a supporting plate or table F, provided with any number of openings $g\ g$, so that the bulb parts of the blanks will hang downward through the openings $g\ g$. Gas-jets I I are arranged below the plate or table F in such positions that the flames will play upon the blanks and reheat the bulbs to a sufficient extent for blowing. The rings E E, with the blanks supported thereby, are then removed from the reheating apparatus and placed in a suitable blow-mold K, having cavities of the shape to which the blank is to be blown, and the unfinished parts of the blanks are then blown, preferably by compressed air, so as to fill the cavities of the mold and complete the articles. The mold K may be formed with a number of cavities, all having communication with a single compressed-air pipe, so that a number of articles may be finished at the same time and in the one operation. In using the mold K the rings on blank-holders E rest on the top of the mold and form caps to the mold-cavities. These holders may be shaped on their under side to correspond with the shoulder part of the article to be made. As our present invention does not relate to the structural features of the molds or other appliances, we do not deem it necessary to give a more specific description of the same.

It is within the purpose and scope of our invention to employ any of the mechanisms or appliances in use in glass-factories, in so far as they may serve the purposes of our invention, which in its broadest sense is the art or process of producing hollow articles of glassware by the employment of the steps or operations successively of first forming a blank with a part thereof finished, next annealing the blank, then reheating the bulb or unfinished portion of the annealed blank, and finally blowing the bulb to produce the body of the article.

It will be seen and appreciated by those conversant with the present methods of operation and the systems employed in running glass-factories that our process has great advantages. As the preliminary work consists in merely pressing a portion of a blank without blowing or reheating it at the glory-hole, no skill except that easily acquired by the gathering-boys and press-mold operators is required in this part of the work. The blank does not have to be rolled or submitted to any of the usual operations necessary to finishing before annealing. Hence a large number of blanks may be produced simultaneously. After annealing the reheating of the blanks and the subsequent finishing may be performed outside the factory proper and by unskilled labor and under such conditions that a large number of blanks may be finished—that is, blown to complete shape—simultaneously, thus reducing the cost of manufacture and increasing the output to an extent in no wise even approachable under present methods.

While we have described a mold for the preliminary pressing of a portion of the blank in which the neck or finished portion is produced at the bottom of the mold—that is, with the blank in an inverted position—we wish it to be understood that we do not restrict ourselves to the use of a mold of this character, but may use any other form of mold suitable for the purpose—as, for instance, the mold shown and described in the patent of Philip Arbogast, July 11, 1882, in which the neck of the blank is formed at the top of the mold, with the unfinished portion of the blank below. Such a mold can be made with a number of cavities and with a top plate constructed to press a number of necks, so that a number of blanks may be pressed simultaneously.

What we claim as new, and desire to secure by Letters Patent, is—

1. The herein-described improvement in the art of forming and finishing hollow glassware, which consists in first forming, by pressure, a suitable blank; second, annealing the blank; third, reheating the annealed blank and finally finishing the article in a suitable mold.

2. The herein-described improvement in the art of forming and finishing glassware, which consists in first producing a blank, having a hollow finished neck and an unfinished bulb or body; then annealing such blank, reheating the annealed blank, and then blowing the body to shape in a suitable blow-mold.

3. The herein-described improvement in the art or process of manufacturing glassware, which consists in first producing a partly-finished blank, annealing such blank, reheating the annealed blank and blowing the body of the same to a finished shape in a suitable mold.

4. The improvement in the art or process of manufacturing glassware, which consists in simultaneously pressing in a mold a number of blanks, and thereby partly finishing the articles to be produced; annealing the blanks; reheating simultaneously a number of the annealed blanks by the local application of gas-jets to the unfinished parts, and finally blowing a number of blanks in a single mold by compressed air.

In testimony whereof we affix our signatures in presence of two witnesses.

JOHN I. ARBOGAST.
CHARLES V. ARBOGAST.
FRANCIS J. ARBOGAST.
PHILIP R. ARBOGAST.
FREDERICK L. ARBOGAST.

Witnesses to signatures of John I. Arbogast and Charles V. Arbogast:
THOS. A. CONNOLLY,
A. A. CONNOLLY.

Witnesses to signatures of F. J. Arbogast, P. R. Arbogast, and F. L. Arbogast:
KATIE MCARDLE,
J. W. FORD.